United States Patent
Glenn, III et al.

(10) Patent No.: US 11,259,535 B2
(45) Date of Patent: Mar. 1, 2022

(54) FOOD PRODUCTS AND SYSTEMS AND METHODS OF MAKING SAME

(71) Applicant: LAND O'LAKES, INC., Arden Hills, MN (US)

(72) Inventors: Thomas Alexander Glenn, III, Shoreview, MN (US); Christina Maria Di Pietro, St. Paul, MN (US)

(73) Assignee: Land O'Lakes, Inc., Arden Hills, MN (US)

( * ) Notice: Subject to any disclaimer, the term of this patent is extended or adjusted under 35 U.S.C. 154(b) by 71 days.

(21) Appl. No.: 16/405,476

(22) Filed: May 7, 2019

(65) Prior Publication Data

US 2020/0352188 A1 Nov. 12, 2020

(51) Int. Cl.

| | |
|---|---|
| A23C 9/142 | (2006.01) |
| A23C 9/13 | (2006.01) |
| A23C 19/08 | (2006.01) |
| A23C 3/02 | (2006.01) |
| A23C 19/04 | (2006.01) |
| A23C 9/137 | (2006.01) |

(52) U.S. Cl.
CPC .............. *A23C 9/1422* (2013.01); *A23C 3/02* (2013.01); *A23C 9/137* (2013.01); *A23C 9/1322* (2013.01); *A23C 9/1427* (2013.01); *A23C 19/043* (2013.01); *A23C 19/08* (2013.01)

(58) Field of Classification Search
CPC ....... A23C 9/1422; A23C 3/02; A23C 9/1322; A23C 9/137; A23C 9/1427; A23C 19/043; A23C 19/08
USPC ..... 426/34, 36, 38, 39, 40, 42, 43, 580, 582
See application file for complete search history.

(56) References Cited

U.S. PATENT DOCUMENTS

| | | | |
|---|---|---|---|
| 4,205,090 A | 5/1980 | Maubois et al. | |
| 4,268,528 A * | 5/1981 | Montigny .......... | A23C 19/0285 426/36 |
| 4,401,679 A | 8/1983 | Rubin et al. | |
| 5,165,945 A * | 11/1992 | Yee .................... | A23C 19/0285 426/36 |
| 5,262,183 A | 11/1993 | Moran et al. | |
| 5,547,691 A * | 8/1996 | Kjaer ................ | A23C 19/0285 426/36 |
| 6,183,805 B1 | 2/2001 | Moran et al. | |
| 8,840,947 B2 | 9/2014 | Scott et al. | |
| 9,826,751 B2 | 11/2017 | Glenn et al. | |
| 2003/0077357 A1 | 4/2003 | Rizvi et al. | |
| 2004/0009261 A1 | 1/2004 | Brody | |
| 2006/0062873 A1 * | 3/2006 | Yee .......................... | A23C 19/05 426/36 |
| 2013/0022729 A1 | 1/2013 | Chinwalla et al. | |
| 2014/0017357 A1 | 1/2014 | Aaltonen et al. | |
| 2015/0064332 A1 * | 3/2015 | Glenn, III .............. | A23C 13/00 426/586 |
| 2018/0070603 A1 | 3/2018 | Glenn et al. | |

FOREIGN PATENT DOCUMENTS

| | | |
|---|---|---|
| CA | 2287708 A1 | 4/2000 |
| EP | 2649884 A1 | 10/2013 |
| FI | 20115161 A | 8/2012 |
| FI | 123267 B | 1/2013 |
| WO | 03003846 A1 | 1/2003 |
| WO | 03069982 A1 | 8/2003 |
| WO | 2009059266 A1 | 5/2009 |
| WO | 2012060723 A1 | 5/2012 |
| WO | 2012110706 A1 | 8/2012 |

OTHER PUBLICATIONS

Ernstrom, C A. et al., "Cheese Base for Processing. A High Yield Product for Whole Milk by Ultrafiltration", J. Dairy Sci. vol. 63, 1980, pp. 228-234.
PCT, "International Search Report and Written Opinion", Application No. PCT/US2015/012241, dated Mar. 26, 2015, 8 pages.
Turgeon, S L. , "Combined effects of microfiltration and ultrafiltration on the composition of skim milk retentate", Journal of Dairy Science, American Dairy Science Association; vol. 78. No. Supp. 1, 1995, pp. 128.
Van Dijk, H.J.M , "The properties of casein micelles—Changes in the state of the micellar calcium phosphate and their effects on other changes in the casein micelles", Netherlands Milk and Dairy Journal; vol. 44 No. 3-4, 1990, pp. 125-141.
Zehren, Vicent L. et al., "Process Cheese: Browning Discoloration, Changing Viscosity & Density Variation", Schreiber Foods, Inc., 1992, pp. 155-158 & 270.

* cited by examiner

*Primary Examiner* — Leslie A Wong
(74) *Attorney, Agent, or Firm* — Dorsey & Whitney LLP

(57) ABSTRACT

Food products and systems and methods for their production involve subjecting pasteurized milk to a concentration process thereby forming liquid concentrated milk, then fermenting the liquid concentrated milk to form a fermented concentrated milk product. The fermented concentrated milk product is combined with a liquid emulsifying agent, thereby forming a food product. The food product is formed without the fermented concentrated milk product and the food product reaching a temperature of 145° F.

20 Claims, 9 Drawing Sheets

FOOD PRODUCTS AND SYSTEMS AND METHODS OF MAKING SAME

TECHNICAL FIELD

The present disclosure generally relates to food products, such as cheese or cheese base products, and systems and methods for their manufacture.

BACKGROUND

In prior processes of making process cheese, the cheese product is typically pasteurized at a temperatures of at least 150° F. Processing the cheese product at 150° F. or higher kills active cultures in the cheese product and also affects the taste, texture, and consistency of the final process cheese product.

SUMMARY

Implementations are directed to food products, such as cheese and cheese based products, and systems and methods for their production.

In one exemplary implementation, a method for the production of a food product involves subjecting pasteurized milk to a concentration process thereby forming liquid concentrated milk followed by fermenting the liquid concentrated milk thereby forming a fermented concentrated milk product. The method also involves combining the fermented concentrated milk product with a liquid emulsifying agent thereby forming a food product. The food product is formed without the fermented concentrated milk product and the food product reaching a temperature of 145° F.

In some implementations, the method for the production of a food product also involves removing moisture from the food product after combining the fermented concentrated milk product with the liquid emulsifying agent through evaporative processing thereby producing an elastic food product. The food product does not reach a temperature of 145° F. during the evaporative processing. Removing moisture from the food product after combining the fermented concentrated milk product with the liquid emulsifying agent through evaporative processing thereby producing an elastic food product may include removing the moisture from the food product through evaporative processing in a wiped film evaporator to produce the elastic food product.

In some implementations of the method, the concentration process includes at least one of ultrafiltration or microfiltration. In some implementations of the method, the concentration process removes at least a portion of lactose or serum proteins from the pasteurized milk using diafiltration. Combining the fermented concentrated milk product with a liquid emulsifying agent thereby forming a food product may include combining, in an inline mixer, the fermented concentrated milk product with the liquid emulsifying agent thereby forming the food product. In some implementations of the method, the liquid emulsifying agent includes at least one of liquid sodium phosphate, liquid sodium citrate, or liquid potassium phosphate. Combining the fermented concentrated milk product with a liquid emulsifying agent thereby forming a food product may include combining the fermented concentrated milk product with a predetermined amount of the liquid emulsifying agent to form the food product of a spreadable cheese. In some implementations, the method for the production of a food product also involves removing moisture from the fermented concentrated milk product through evaporative processing after fermenting the liquid concentrated milk and before combining the fermented concentrated milk product with the liquid emulsifying agent. The fermented concentrated milk product does not reach a temperature of 145° F. during the evaporative processing. In some implementations, the method for the production of a food product also involves combining the fermented concentrated milk product with chymo sin.

In another exemplary implementation, a method for the production of a food product involves fermenting liquid concentrated milk thereby forming a fermented concentrated milk product, followed by combining the fermented concentrated milk product with a liquid emulsifying agent thereby forming a food product. The food product is formed without the fermented concentrated milk product and the food product reaching a temperature of 145° F.

In some implementations, the method for the production of a food product also involves removing moisture from the food product after combining the fermented concentrated milk product with the liquid emulsifying agent through evaporative processing thereby producing an elastic food product. The food product does not reach a temperature of 145° F. during the evaporative processing. Removing moisture from the food product after combining the fermented concentrated milk product with the liquid emulsifying agent through evaporative processing thereby producing an elastic food product may include removing the moisture from the food product through evaporative processing in a wiped film evaporator to produce the elastic food product.

In some implementations, the method for the production of a food product also involves subjecting pasteurized milk to a concentration process thereby forming the liquid concentrated milk. The concentration process may include at least one of ultrafiltration or microfiltration and may remove at least a portion of lactose or serum proteins from the pasteurized milk using diafiltration. The liquid emulsifying agent may include at least one of liquid sodium phosphate, liquid sodium citrate, or liquid potassium phosphate. In some implementations, the method for the production of a food product also involves hydrating one or more dairy powders to form the form the liquid concentrated milk.

In another exemplary implementation, a method for the production of a food product involves combining a dairy product with a liquid emulsifying agent thereby forming a food product. The dairy product includes one of ground cheese or a fermented concentrated milk product and the food product is formed without the dairy product and the food product reaching a temperature of 145° F.

In some implementations of the method, the dairy product includes the ground cheese. In some implementations of the method, the dairy product includes the fermented concentrated milk product, and the method further involves forming the dairy product by filtrating pasteurized whole milk using at least one of ultrafiltration or microfiltration to form a liquid concentrated milk, followed by fermenting the liquid concentrated milk to form the fermented concentrated milk product. In some implementations of the method, the dairy product includes the fermented concentrated milk product and the method further comprises forming the dairy product by hydrating one or more dairy powders to form the form a liquid concentrated milk, follow by fermenting the liquid concentrated milk to form the fermented concentrated milk product.

DETAILED DESCRIPTION OF THE EMBODIMENTS

Figure 1:
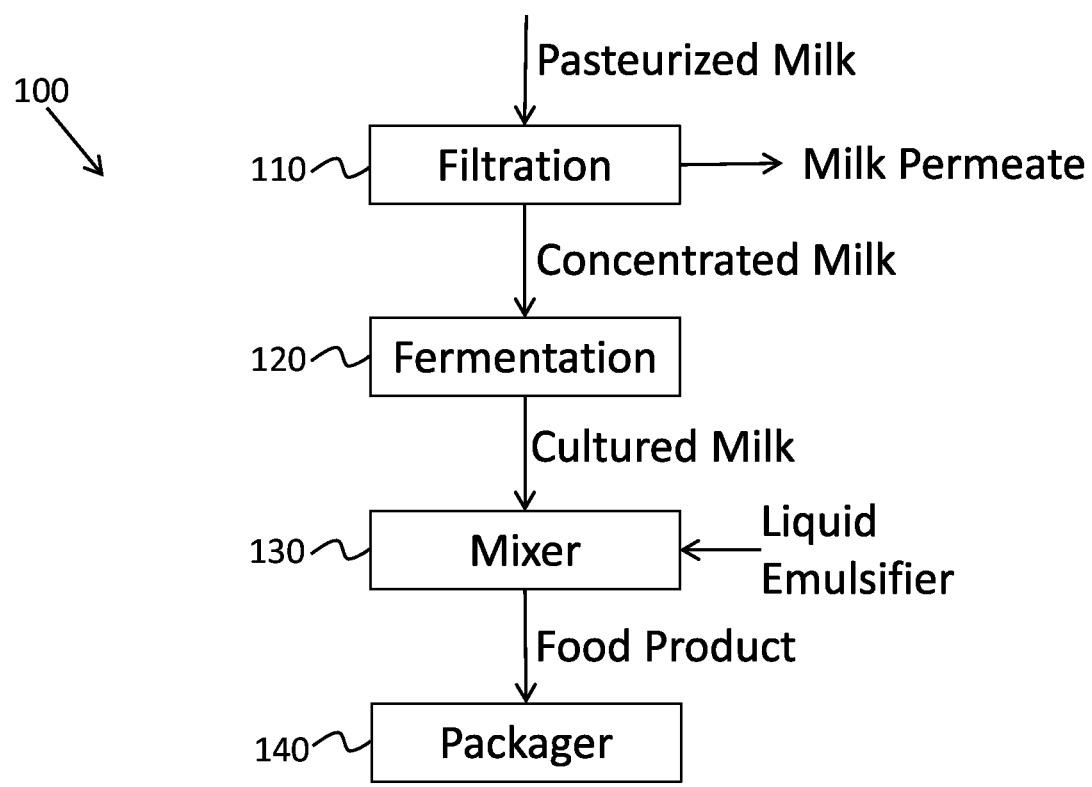
FIGS. 1-7 illustrate exemplary food product production systems according to implementations of the present disclosure.

Overview:

Natural cheese, process cheese products, concentrates, and other food products may be produced according to the present disclosure. The processes may involve combining a fermented concentrated milk product with a liquid emulsifying agent, thereby forming a food product. Whereas conventional process cheese products require a pasteurization step whereby the cheese product is heated for instance for not less than 30 second at a temperature of not less than 150° F., various embodiments of food products according to this disclosure are formed without bringing a fermented concentrated milk product or the food product to a temperature that kills active cultures in the products, such as 150° F. The resulting food products of this disclosure, then, may include characteristics of natural cheese and active cultures common to natural cheese, as the resulting food products have not been pasteurized beyond any initial milk pasteurization procedures that occur prior to fermentation processes, and active cultures have been subsequently added to the product. The resulting food product also may simultaneously include flavor, texture, melting, and/or performance characteristics of process cheese. Thus, the resulting food product may be considered a hybrid of natural cheese and process cheese, and may include products having a variety of consistencies including cheese spread products, plastic-like cheese products, elastic-like cheese products, elastic cheese products, or solid-like cheese products. Because the food product is not subjected to direct steam injection or other indirects forms of heat treatment sufficient to kill active cultures in the food product, energy costs for steam generation and utilization along with cooling of heat-treated product and associated capital is reduced Detailed Description of the Figures:

As illustrated in the system 100 of FIG. 1, pasteurized milk may be subjected to a concentration process 110 thereby forming liquid concentrated milk. For example, in many embodiments, the concentration process 110 includes at least one of ultrafiltration, microfiltration, reverse osmosis, evaporation, or some combination thereof. In some embodiments, the concentration process 110 may be performed under a vacuum. The pasteurized milk subjected to the concentration process may include whole milk, reduced fat milk, skim milk, cream, ultrafiltered milk, microfiltered milk, buttermilk, condensed skim milk, condensed whole milk, condensed butter milk, or mixtures thereof, or rehydrated mixtures thereof. The pasteurized milk subjected to the concentration process 110 may include milk standardized to a targeted feed composition prior to the concentration process.

Moreover, in some embodiments, the concentration process 110 may include removing at least a portion of the lactose or serum proteins from the pasteurized milk using diafiltration. For example, at least one of ultrafiltration or microfiltration may be used in combination with diafiltration to form a liquid concentrated milk having at least portion of the lactose or serum proteins of the pasteurized milk removed while forming the liquid concentrated milk. In some embodiments, an evaporation process may be utilized as the concentration process 110. The evaporation process may, for example, concentrate the pasteurized milk without removing lactose or serum proteins.

The liquid concentrated milk formed during the concentration process 110 may include salted or unsalted liquid concentrated milk having a predetermined amount of solids. The predetermined amount of solids may include a total solids of between about 15 wt % and about 60 wt % of the unsalted liquid concentrated milk, between about 20 wt % and about 55 wt % of the unsalted liquid concentrated milk, or between about 25 wt % and about 50 wt % of the unsalted liquid concentrated milk. In some embodiments, the total solids of the unsalted liquid concentrated milk may be selected based upon a desired texture or consistency of the final food product. For example, the total solids of the unsalted liquid concentrated milk in a lower solids version may be between about 20 wt % and about 30 wt % of the unsalted liquid concentrated milk, or about 25 wt % of the unsalted liquid concentrated milk. The total solids of the unsalted liquid concentrated milk in an intermediate solids version may be between about 35 wt % and about 50 wt % of the unsalted liquid concentrated milk, between about 39 wt % and about 45 wt % of the unsalted liquid concentrated milk, or about 42 wt % of the unsalted liquid concentrated milk. The total solids of the unsalted liquid concentrated milk in a higher solids version may be between about 45 wt % and about 55 wt % of the unsalted liquid concentrated milk, or about 50 wt % of the unsalted liquid concentrated milk. Typically, in its unconcentrated form, milk has a total solids content of about about 11 to about 13 wt %.

The unsalted liquid concentrated milk may include compounds typically found in unsalted concentrated milk, such as fat, casein, whey protein, nonprotein nitrogen (NPN), ash, and lactose.

In many embodiments of system 100, salt may be combined with the liquid concentrated milk formed immediately after the concentration process to form a salted liquid concentrated milk. Salt may be added in amounts of between about 0.5 wt % and about 3 wt % of the salted liquid concentrated milk, or between about 0.9 wt % and about 2.5 wt % of the salted liquid concentrated milk. In many embodiments, the amount of salt added the liquid concentrated milk product may be selected based upon a desired texture, consistency, or flavor of the final food product. For example, in the lower solids version referenced above, salt added to the liquid concentrated milk may be between about 0.85 wt % and about 1.35 wt % of the salted liquid concentrated milk, between about 0.96 wt % and about 1.24 wt % of the salted liquid concentrated milk, about 0.96 wt % of the salted liquid concentrated milk, about 0.98 wt % of the salted liquid concentrated milk, about 1.07 wt % of the salted liquid concentrated milk, or about 1.24 wt % of the salted liquid concentrated milk. In the intermediate solids version referenced above, salt added to the liquid concentrated milk may be between about 1.5 wt % and about 2.2 wt % of the salted liquid concentrated milk, between about 1.6 wt % and about 2.1 wt % of the salted liquid concentrated milk, about 1.61 wt % of the salted liquid concentrated milk, about 1.63 wt % of the salted liquid concentrated milk, about 1.78 wt % of the salted liquid concentrated milk, or about 2.07 wt % of the salted liquid concentrated milk. In the higher solids version referenced above, salt added to the liquid concentrated milk may be between about 1.8 wt % and about 2.6 wt % of the salted liquid concentrated milk, between about 1.9 wt % and about 2.5 wt % of the salted liquid concentrated milk, about 1.91 wt % of the salted liquid concentrated milk, about 1.93 wt % of the salted liquid concentrated milk, about 2.11 wt % of the salted liquid concentrated milk, or about 2.46 wt % of the salted liquid concentrated milk.

In some embodiments, the liquid concentrated milk may be subjected to a heat treatment before being subjected to a fermentation process 120. Occasionally, microorganism growth or concentration may occur in the concentration system over the course of operation of the concentration system used in the concentration process 110. The microorganism growth or concentration may occur between standard cleaning processes and may affect the quality of the liquid concentrated milk. To manage the microorganism growth or concentration that may occur in the concentration system, the liquid concentrated milk may be subjected to a heat treatment prior to being subjected to the fermentation process 120.

Continuing in FIG. 1, the (unsalted or salted) liquid concentrated milk may be subjected to a fermentation process 120 thereby forming a fermented or cultured concentrated milk product. The liquid concentrated milk may be fermented with one or more dairy cultures, such as a highly-concentrated, freeze-dried starter culture. In many embodiments, the freeze-dried starter culture may be combined with the liquid concentrated milk in amount of between about 0.002 wt % and about 0.5 wt % of the liquid concentrated milk, between about 0.002 wt % and about 0.3 wt % of the liquid concentrated milk, between about 0.002 wt % and about 0.2 wt % of the liquid concentrated milk, between about 0.002 wt % and about 0.1 wt % of the liquid concentrated milk, between about 0.01 wt % and about 0.1 wt % of the liquid concentrated milk, between about 0.005 wt % and about 0.02 wt % of the liquid concentrated milk, between about 0.01 wt % and about 0.02 wt % of the liquid concentrated milk, less than about 0.5 wt % of the liquid concentrated milk, less than about 0.4 wt % of the liquid concentrated milk, less than about 0.3 wt % of the liquid concentrated milk, less than about 0.2 wt % of the liquid concentrated milk, less than about 0.1 wt % of the liquid concentrated milk, less than about 0.05 wt % of the liquid concentrated milk, less than about 0.04 wt % of the liquid concentrated milk, less than about 0.03 wt % of the liquid concentrated milk, less than about 0.02 wt % of the liquid concentrated milk, or less than about 0.01 wt % of the liquid concentrated milk.

The unsalted liquid concentrated milk may include compounds typically found in unsalted concentrated milk, such as fat, casein, whey protein, true protein, NPN, ash, and lactose. During fermentation, lactic acid is formed in the fermented or cultured concentrated milk product, thus reducing the amount of lactose in the fermented or cultured concentrate milk product relative to the amount of lactose in the liquid concentrated milk.

Continuing in FIG. 1, the fermented or cultured concentrated milk product may be combined with a liquid emulsifying agent in a mixer 130 thereby forming a food product. The liquid emulsifying agent may include at least one of liquid sodium phosphate, liquid sodium citrate, liquid potassium phosphate, liquid potassium citrate, or a combination thereof. In some embodiments, other liquid emulsifying agents may be mixed with the fermented or cultured concentrate milk product in the mixer. Combining the liquid emulsifying agent with the fermented or cultured concentrated milk product transforms the fermented or cultured concentrated milk product from a liquid product to a food product having a more solid, plastic-like, elastic like, or elastic consistency. The food product may be described as having Herschel-Bulkey fluid characteristics prior to any significant fat crystallization and solidification upon cooling, such that the food product exhibits shear thinning behavior with a yield stress. For example, the food product formed by combining the liquid emulsifying agent and the fermented or cultured concentrated milk product may include texture characteristics reminiscent of process cheese. Accordingly, the food product formed by combining the liquid emulsifying agent and the fermented cultured concentrated milk product may include elastic or plastic texture characteristics that allow the food product to be sliced and/or shredded.

As described in greater detail below, while the texture characteristics of the food product may be similar to process cheese, the transformation from the liquid concentrated milk product to the elastic or plastic food product occurs at a much lower temperature than conventional "hot" emulsification pasteurization processes used to manufacture pasteurized processed cheese. These conventional emulsification pasteurization processes used to manufacture pasteurized processed cheese also kill active cultures in the product during the emulsification pasteurization process. In contrast to these conventional emulsification pasteurization processes, active cultures in the fermented or cultured concentrated milk product according to the present disclosure are not killed by the addition of the liquid emulsifying agent. Because liquid forms of the emulsifier are used in the systems described herein, additional heat is not required to melt and disperse crystalline traditional forms of emulsifying salts. The use of liquid emulsifying salts also is beneficial to the final food product because the liquid emulsifying salts raise the pH of the fermented or cultured concentrated milk product, thereby allowing more flavor to be perceived in the final food product rather than the tart and acidic flavors that may be found with the fermented concentrated milk product.

Formation of conventional pasteurized process cheese typically require heat treatment during the pasteurization step of process cheese. For example, the Code of Federal Regulations requires that pasteurized process cheese be heated for not less than 30 seconds at a temperature of not less than 150° F. According to the Pasteurized Milk Ordinance, if the fat content of the milk product is less than 10%, if a total solids of the milk product is less than 18%, or if the milk product contains no added sweeteners, pasteurization may be dropped to 145° F. for 30 minutes. Otherwise, pasteurization of conventional pasteurized process cheese typically requires temperatures of 161° F. for 15 seconds, 191° F. for 1.0 second, 194° F. for 0.5 seconds, 201° F. for 0.1 seconds, 204° F. for 0.05 seconds, or 212° F. for 0.01 seconds. Heat treatment includes, most commonly, direct steam injection.

While the formation of the liquid emulsifying agent results in an exothermic reaction, the food product formed when emulsifying the fermented or cultured concentrated milk product with the liquid emulsifying agent does not reach a temperature of 150° F. The fermented concentrated milk product is not subjected to direct steam injection or other forms of heat treatment when the liquid emulsifying agent is added to the fermented concentrated milk product. Instead, the liquid emulsifying agent is combined with the fermented concentrated milk product in the absence of external heat being added directly to the mixture, the external heat including direct steam injection and direct or indirect heating of at least one of the fermented concentrated milk product, the liquid emulsifying agent, or the combination of the fermented concentrated milk product and the liquid emulsifying agent.

Figure 8:
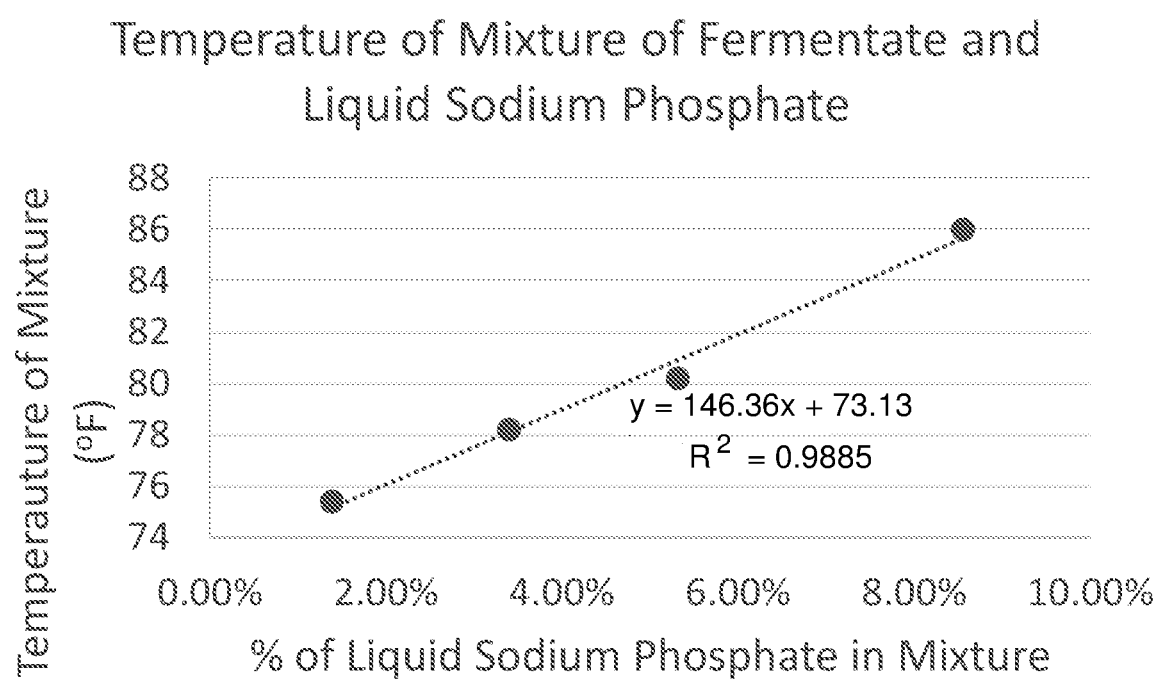
FIG. 8 is a graph illustrating the temperature of a mixture of fermentate and varying concentrations of sodium phosphate.

In many embodiments, the food product formed when emulsifying the fermented or cultured concentrated milk product with the liquid emulsifying agent does not reach a temperature of 150° F., 145° F., 140° F., 135° F., 130° F., 125° F., 120° F., 115° F., 110° F., 105° F., 100° F., 95° F., or 90° F. For example, it was observed that when a fermented concentrated milk product at room temperature (approximately 75° F.) was mixed with a liquid emulsifying agent at approximately 195-196° F., the temperature of the mixture of the fermented concentrated milk product and the liquid emulsifying agent forming the food product was between about 75° F. and about 86° F., depending on the amount of liquid emulsifying agent mixed with the fermented concentrated milk product. FIG. 8 is a graph demonstrating the temperature of the mixture of the fermented concentrated milk product and the liquid emulsifying agent forming the food product relative to the amount of liquid (sodium phosphate) emulsifier used in the mixture. Specifically, it was observed that when liquid emulsifying agent in an amount of 1.4 wt % of the mixture at a temperature of between 195-196° F. was combined with the fermented concentrated milk product at 74.4° F., the temperature of the resulting mixture was 75.4° F. It was further observed that when liquid emulsifying agent in an amount of 3.4 wt % of the mixture at a temperature of between 195-196° F. was combined with the fermented concentrated milk product at 75.2° F., the temperature of the resulting mixture was 78.2° F. It was further observed that when liquid emulsifying agent in an amount of 5.3 wt % of the mixture at a temperature of between 195-196° F. was combined with the fermented concentrated milk product at 75.3° F., the temperature of the resulting mixture was 80.2° F. It was further observed that when liquid emulsifying agent in an amount of 8.5 wt % of the mixture at a temperature of between 195-196° F. was combined with the fermented concentrated milk product at 75.4° F., the temperature of the resulting mixture was 86.0° F. Accordingly, temperatures reached during combining the liquid emulsifying agent and the fermented or cultured concentrated milk product described herein do not kill the active cultures typical to the fermented or cultured concentrated milk product. For example, in some embodiments, the active cultures in the fermented or cultured concentrated milk product may be killed at temperatures between approximately 100° F. and 120° F. Accordingly, in some embodiments, the temperatures reached during combining the liquid emulsifying agent and the fermented or cultured concentrated milk product described herein do not reach 100° F. In some embodiments, the temperatures reached during combining the liquid emulsifying agent and the fermented or cultured concentrated milk product described herein do not reach 105° F. In some embodiments, the temperatures reached during combining the liquid emulsifying agent and the fermented or cultured concentrated milk product described herein do not reach 110° F. In some embodiments, the temperatures reached during combining the liquid emulsifying agent and the fermented or cultured concentrated milk product described herein do not reach 115° F. In some embodiments, the temperatures reached during combining the liquid emulsifying agent and the fermented or cultured concentrated milk product described herein do not reach 120° F. In some embodiments, the temperatures reached during combining the liquid emulsifying agent and the fermented or cultured concentrated milk product described herein do not reach 125° F.

The amount of liquid emulsifying agent combined with the fermented or cultured concentrated milk product may vary according to different embodiments. According to various embodiments, the relative amount of liquid emulsifying agent combined with the fermented or cultured concentrated milk product may be selected to achieve desired texture or consistency in the final food product. For example, a food product having softer, process cheese spread characteristics may be formed using less liquid emulsifying agent than the liquid emulsifying agent used to form a more elastic or plastic process cheese food product. In some embodiments, the amount of liquid emulsifying agent combined with the fermented or cultured concentrated milk product may be between about 1.0 wt % and about 6.0 wt % of the food product, between about 1.5 wt % and about 5.5 wt % of the food product, between about 2 wt % and about 5 wt % of the food product, between about 4.0 wt % and about 6.0 wt % of the product, between about 4.5 wt % and about 5.5 wt % of the food product, less than about 6.0 wt % of the food product, less than about 5.5 wt % of the food product, less than about 5.0 wt % of the food product, less than about 4.5 wt % of the food product, less than about 4.0 wt % of the food product, less than about 3.5 wt of the food product, less than about 3.0 wt % of the food product, less than about 2.5 wt % of the food product, or less than about 2.0 wt % of the food product.

In some embodiments, the amount of liquid emulsifying agent used in the food product may be determined as a ratio to the amount of fat in the food product. For example, for every 1 part fat in the food product, the food product may include between about 0.05 and about 0.3 parts liquid emulsifying agent, between about 0.1 and about 0.25 parts liquid emulsifying agent, between about 0.15 and about 0.22 parts liquid emulsifying agent, less than about 0.3 parts liquid emulsifying agent, less than about 0.25 parts liquid emulsifying agent, or less than about 0.22 parts liquid emulsifying agent. For example, in an embodiment of a food product having about 39.6 wt % moisture and about 28.2 wt % fat, the food product may include about 4.7 wt % liquid emulsifying agent, or 0.1668 parts liquid emulsifying agent per 1 part fat. In another embodiment, a food product having about 39.5 wt % moisture and about 31.91 wt % fat, the food product may include about 4.67 wt % liquid emulsifying agent, or 0.1465 parts liquid emulsifying agent per 1 part fat. In another embodiment, a food product having about 49.8 wt % moisture and about 20.20 wt % fat, the food product may include about 4.32 wt % liquid emulsifying agent, or 0.2139 parts liquid emulsifying agent per 1 part fat. In another embodiment, a food product having about 41.15 wt % moisture and about 26.73 wt % fat, the food product may include about 5.42 wt % liquid emulsifying agent, or 0.2027 parts liquid emulsifying agent per 1 part fat.

The mixer 130 may include any of a number of different mixers, such as an inline mixer. In some embodiments, the liquid emulsifying agent is combined with the fermented or cultured concentrated milk product in a continuous manner in an inline mixer after the formation of the fermented or cultured concentrated milk product in order to maximize the structure forming properties of the intact casein present in the fermented or cultured concentrated milk product. Utilizing more intact casein in the food product may allow for less casein to be required in the food product while still achieving similar texture characteristics of conventional process cheese. Reducing the amount of casein in the food product would, in turn, lower the overall production costs of the food product. Furthermore, adding the liquid emulsifying agent in a very short duration after the concentrated milk is fermented is advantageous to forming a food fermented product having more intact casein relative to natural cheese where intact casein is reduced prior to use by sitting for an extended period of time. In some embodiments, the liquid emulsifying agent may be injected into the fermented or cultured concentrated milk product in the inline mixer.

Returning to FIG. 1, the food product may then be packaged in a packager 140. For example, the food product may be sent from the mixer 130 to a packager 140, such as a filler, for packaging of the food product. It is noted that throughout the system 100 of FIG. 1, the food product is formed without treating the fermented or cultured concentrated milk product or the food product with heat sufficient to kill active cultures in the fermented or cultured concentrated milk product or the food product, such that the fermented or cultured concentrated milk product and the food product do not reach a temperature of 150° F., 145° F., 140° F., 135° F., 130° F., 125° F., 120° F., 115° F., 115° F., 110° F., 105° F., or 100° F. according to various embodiments.

The resulting food product may accordingly be a dairy-based product with a total solids content of about 25 wt % to about 50 wt %, about 35 wt % to about 45 wt %, or about 40 wt %, with the balance being moisture. For instance, the concentrated milk may have a total solids content of about 42 wt %, and this solids content may be retained within about 1 to about 2 percentage points through the production steps including salting, fermenting and adding a phosphate. A fat content of the food product may be about 10 wt % to about 30 wt %, 15 wt % to about 25 wt %, or about 18 wt % to about 22 wt %. Protein in the food product may be about 8 wt % to about 18 wt %, 15 wt % to about 20 wt %; lactose about 0.5 wt % to about 7 wt %, or about 2 wt % to about 6 wt %.

Figure 2:
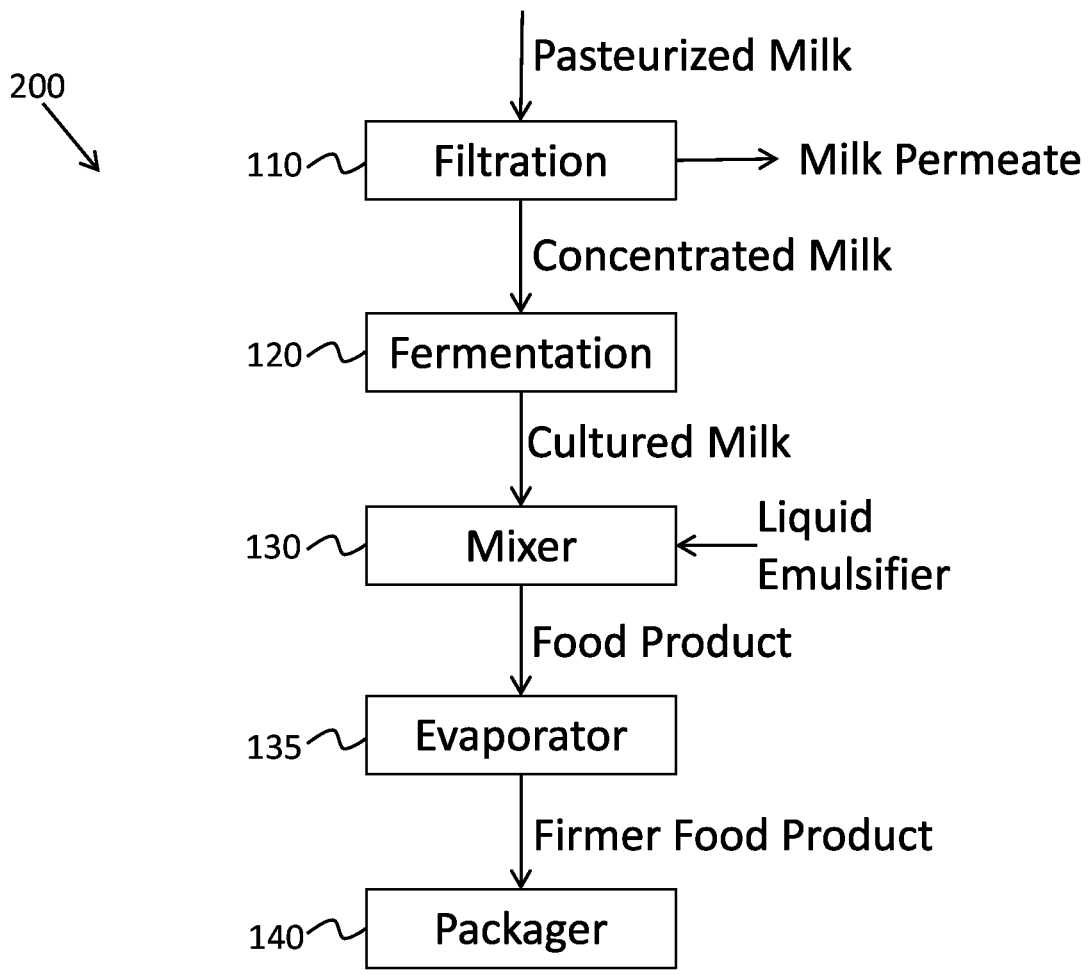

Turning to FIG. 2, according to another exemplary embodiment, a food product may be produced according to the system 200 of FIG. 2. Aspects of system 200 that are the same as system 100 include numbering corresponding to FIG. 1. According to this embodiment, the food product may be fed to an evaporator 135 before being packaged at the packager 140. At the evaporator 135, a portion of the moisture of the food product is removed through evaporative processing, thereby forming a firmer food product having more total solids than the food product prior to evaporation. Accordingly, the consistency or texture of the final food product may be adjusted by one or more of the amount of the liquid emulsifying agent and/or removal of moisture in the food product through evaporative processing to achieve a desired consistency in the final food product. Following removal of a portion of the moisture of the food product at the evaporator 135, the firmer food product is sent from the evaporator 135 to the packager 140.

Evaporative processing at the evaporator 135 may reduce the moisture content in the food product to a desired level. For example, evaporator processing at the evaporator may reduce the moisture content in the food product to between about 30 wt % and about 70 wt % of the food product, between about 35 wt % and about 65 wt % of the food product, between about 40 wt % and about 60 wt % of the food product, between about 35 wt % and about 45 wt % of the food product, between about 45 wt % and about 55 wt % of the food product, between about 55 wt % and about 65 wt % of the food product, about 40 wt % of the food product, about 45 wt % of the food product, about 50 wt % of the food product, about 55 wt % of the food product, about 60 wt % of the food product, less than about 60 wt % of the food product, less than about 55 wt % of the food product, less than about 50 wt % of the food product, less than about 45 wt % of the food product, or less than about 40 wt % of the food product. Evaporative processing may reduce the moisture content of the food by between about 5 wt % and about 40 wt %, between about 5 wt % and about 20 wt %, or between about 20 wt % and about 40 wt % according to different embodiments.

During evaporative food processing at the evaporator 135, the food product does not reach a temperature sufficient to kill the active cultures in the food product. The food product is not subjected to direct steam injection and may not be subjected to other forms of heat treatment sufficient to kill active cultures when moisture is removed from the food product through the evaporative process. Moreover, when moisture is removed from the food product through an evaporative process, the moisture is removed in the absence of external heat being added directly to the food product. Accordingly, during evaporative processing at the evaporator 135, the food product may not reach a temperature about 150° F., 145° F., 140° F., 135° F., 130° F., 125° F., 120° F., 115° F., 115° F., 110° F., 105° F., or 100° F. according to various embodiments.

The evaporator 135 may include at least one of a wiped film evaporator, a thin film evaporator, a spinning cone evaporator, or an evaporative scraped surface heat exchangers, although a wiped film evaporator may be preferred. For example, the food product may be fed at ambient temperatures to the evaporator 135, such as a Pfaulder Model 8.8-12S-0-S wiped film evaporator having 8.8 square feet of surface area.

As noted above, during evaporative processing at the wiped film evaporator, the food product may not reach a temperature about 150° F., 145° F., 140° F., 135° F., 130° F., 125° F., 120° F., 115° F., 110° F., 105° F., or 100° F. according to various embodiments. To achieve evaporation of moisture in the food product without causing the food product to reach at least one of the listed temperatures, the evaporation chamber of the wiped film evaporator may be configured as a vacuum chamber and may be operate under a vacuum pressure. For example, the evaporation chamber may be configured operate under of a vacuum pressure of between about 24.5 and about 29.3 inches of mercury, between about 25 and about 29.2 inches of mercury, between about 26.0 inches of mercury and about 29.0 inches of mercury, between about 27.0 and about 28.0 inches of mercury, greater than about 24.1 inches of mercury, greater than about 26.2 inches of mercury, greater than about 27.8 inches of mercury, greater than about 28.7 inches of mercury, greater than about 28.9 inches of mercury, or greater than about 29.0 inches of mercury. It is noted that: at a vacuum pressure of 24.04 inches of mercury, the food product being evaporated would not exceed 140° F.; at a vacuum pressure of 26.28 inches of mercury, the food product being evaporated would not exceed 122° F.; at a vacuum pressure of 27.75 inches of mercury, the food product being evaporated would not exceed 104° F.; at a vacuum pressure of 28.67 inches of mercury, the food product being evaporated would not exceed 86° F.; at a vacuum pressure of 28.92 inches of mercury, the food product being evaporated would not exceed 80° F.; at a vacuum pressure of 29.02 inches of mercury, the food product being evaporated would not exceed 76° F.; and at a vacuum pressure of 29.12 inches of mercury, the food product being evaporated would not exceed 72° F.

Figure 3:
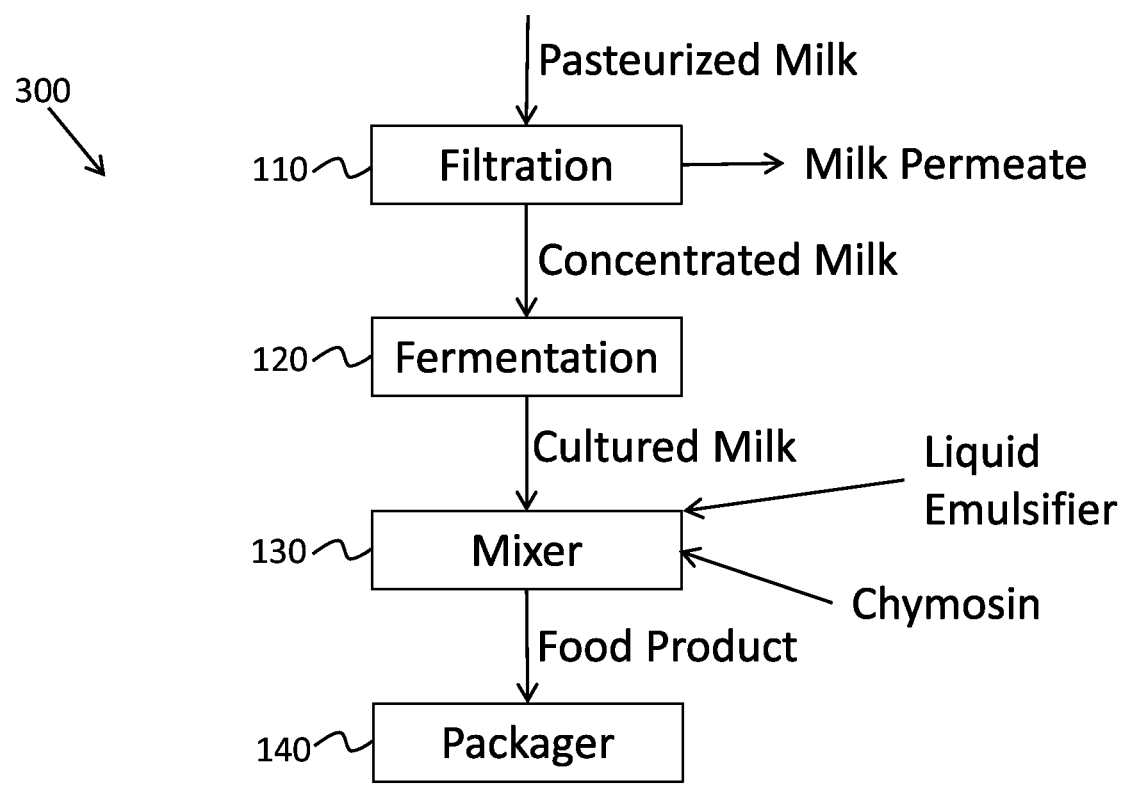

According to another exemplary embodiment, a food product may be produced according to the system 300 of FIG. 3. Aspects of system 300 that are the same as system 100 include numbering corresponding to FIG. 1. According to this embodiment, the fermented or cultured concentrated milk product may be combined with the liquid emulsifying agent and also chymosin in a mixer 130 thereby forming a food product. The chymosin may enhance flavor or texture of the food product. The chymosin may be added to the fermented or cultured concentrated milk product at substantially the same time as the liquid emulsifying agent, before the liquid emulsifying agent, or after the liquid emulsifying agent. While system 300 includes addition of chymosin in the mixer 130, in other embodiments, chymosin may be added to the fermented or cultured concentrated milk product before the liquid emulsifying agent and in a different unit.

The resulting food product may accordingly be a dairy-based product with a total solids content of about 45 wt % to 65 wt %, about 48 wt % to about 62 wt %, or about 50 wt % to about 60 wt %, with the balance being moisture. A fat content of the food product may be about 15 wt % to about 35 wt % or about 18 wt % to about 32 wt %. Protein in the food product may be about 15 wt % to about 20 wt %, lactose about 2 wt % to about 6 wt %. Prior to the evaporation step, the food product may have a total solids content of about 25 wt % to about 50 wt %, about 35 wt % to about 45 wt %, or about 40 wt %, with the balance being moisture. For instance, the concentrated milk may have a total solids content of about 42 wt %, and this solids content may be retained within about 1 to about 2 percentage points through the production steps including salting, fermenting and adding a phosphate. Then at the time of evaporation, the total solids content may be raised to the aforementioned values.

Although not shown in FIG. 3, the food product formed by combining the fermented or cultured concentrated milk product with the liquid emulsifying agent and the chymosin may be fed to the evaporator 135 for evaporative processing before being packaged at the packager 140.

Figure 4:
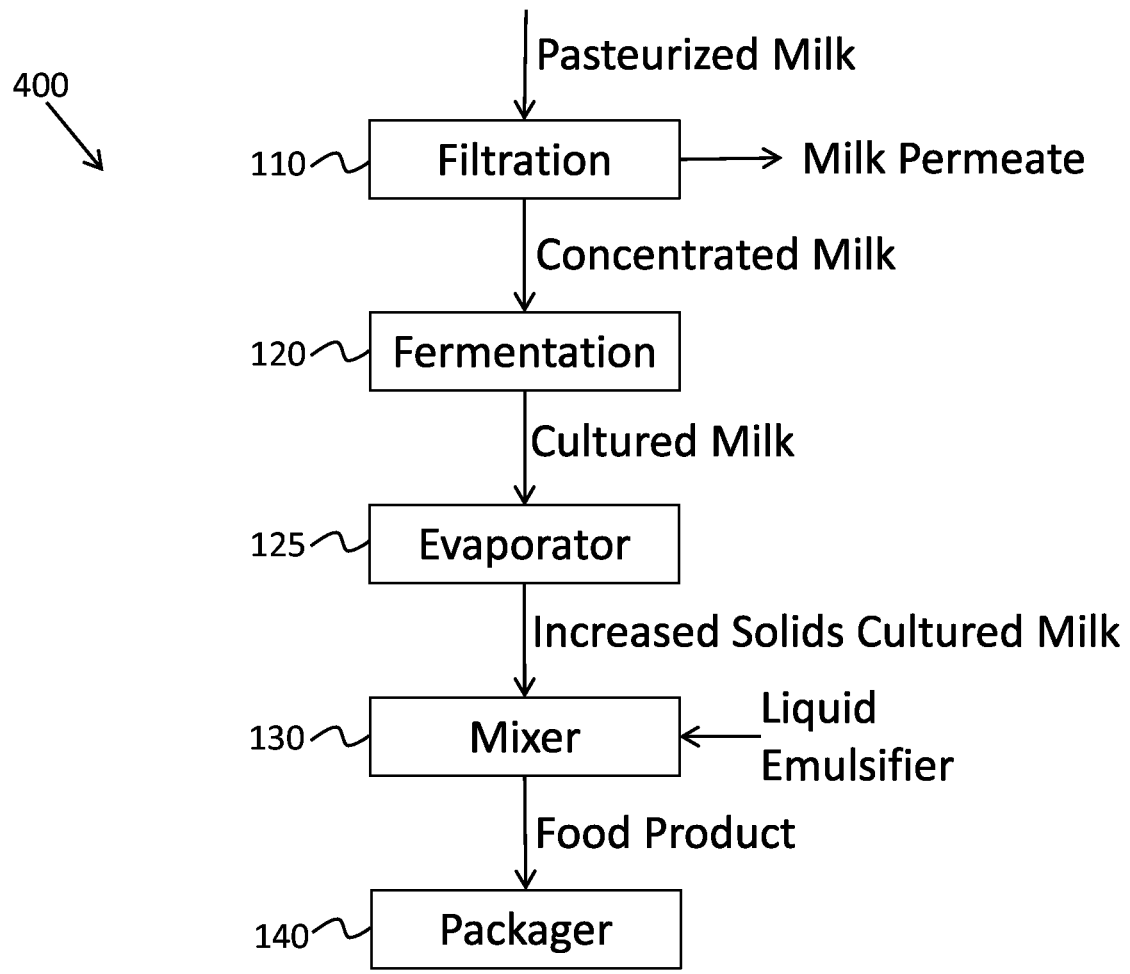

According to another exemplary embodiment, a food product may be produced according to the system 400 of FIG. 4. Aspects of system 400 that are the same as system 100 include numbering corresponding to FIG. 1. According to this embodiment, the fermented or cultured concentrated milk product may be fed to the evaporator 125 thereby forming an increased solids cultured milk before being combined with the liquid emulsifying agent in the mixer 130. The evaporator 125 may include any evaporator described above in relation to the evaporator 135.

For example, at the evaporator 125, a portion of the moisture of the fermented or cultured concentrated milk product is removed through evaporative processing, thereby forming an increased solids fermented or cultured concentrated milk product. Accordingly, the consistency or texture of the final food product may be adjusted by one or more of the amount of the liquid emulsifying agent and/or removal of moisture in the fermented or cultured concentrated milk product through evaporative processing to achieve a desired consistency in the final food product. Following removal of a portion of the moisture of the fermented or cultured concentrated milk product at the evaporator 125, the increased solids fermented or cultured concentrated milk product is sent from the evaporator 125 to the mixer 130.

During evaporative food processing at the evaporator 125, the fermented or cultured concentrated milk product does not reach a temperature sufficient to kill the active cultures in the fermented or cultured concentrated milk product. The fermented or cultured concentrated milk product is not subjected to direct steam injection and may not be subjected to other forms of heat treatment when moisture is removed from the fermented or cultured concentrated milk product through the evaporative process. Moreover, when moisture is removed from the fermented or cultured concentrated milk product through an evaporative process, the moisture is removed in the absence of external heat being added directly to the fermented or cultured concentrated milk product. Accordingly, during evaporative processing at the evaporator 125, the fermented or cultured concentrated milk product may not reach a temperature about 150° F., 145° F., 140° F., 135° F., 130° F., 125° F., 120° F., 115° F., 115° F., 110° F., 105° F., or 100° F. according to various embodiments.

The evaporator 125 may include at least one of a wiped film evaporator, a thin film evaporator, a spinning cone evaporator, or an evaporative scraped surface heat exchangers, although a wiped film evaporator may be preferred. For example, the fermented or cultured concentrated milk product may be fed at ambient temperatures to the evaporator 125, such as a Pfaulder Model 8.8-12S-0-S wiped film evaporator having 8.8 square feet of surface area.

As noted above, during evaporative processing at the wiped film evaporator, the fermented or cultured concentrated milk product may not reach a temperature about 150° F., 145° F., 140° F., 135° F., 130° F., 125° F., 120° F., 115° F., 115° F., 110° F., 105° F., or 100° F. according to various embodiments. To achieve evaporation of moisture in the fermented or cultured concentrated milk product without causing the fermented or cultured concentrated milk product to reach at least one of the listed temperatures, the evaporation chamber of the wiped film evaporator may be configured as a vacuum chamber and may be operate under a vacuum pressure. For example, the evaporation chamber may be configured operate under of a vacuum pressure of between about 24.5 and about 29.3 inches of mercury, between about 25 and about 29.2 inches of mercury, between about 26.0 inches of mercury and about 29.0 inches of mercury, between about 27.0 and about 28.0 inches of mercury, greater than about 24.1 inches of mercury, greater than about 26.2 inches of mercury, greater than about 27.8 inches of mercury, greater than about 28.7 inches of mercury, greater than about 28.9 inches of mercury, or greater than about 29.0 inches of mercury. It is noted that: at a vacuum pressure of 24.04 inches of mercury, the fermented or cultured concentrated milk product being evaporated would not exceed 140° F.; at a vacuum pressure of 26.28 inches of mercury, the fermented or cultured concentrated milk product being evaporated would not exceed 122° F.; at a vacuum pressure of 27.75 inches of mercury, the fermented or cultured concentrated milk product being evaporated would not exceed 104° F.; at a vacuum pressure of 28.67 inches of mercury, the fermented or cultured concentrated milk product being evaporated would not exceed 86° F.; at a vacuum pressure of 28.92 inches of mercury, the fermented or cultured concentrated milk product being evaporated would not exceed 80° F.; at a vacuum pressure of 29.02 inches of mercury, the fermented or cultured concentrated milk product being evaporated would not exceed 76° F.; and at a vacuum pressure of 29.12 inches of mercury, the fermented or cultured concentrated milk product being evaporated would not exceed 72° F.

Figure 5:
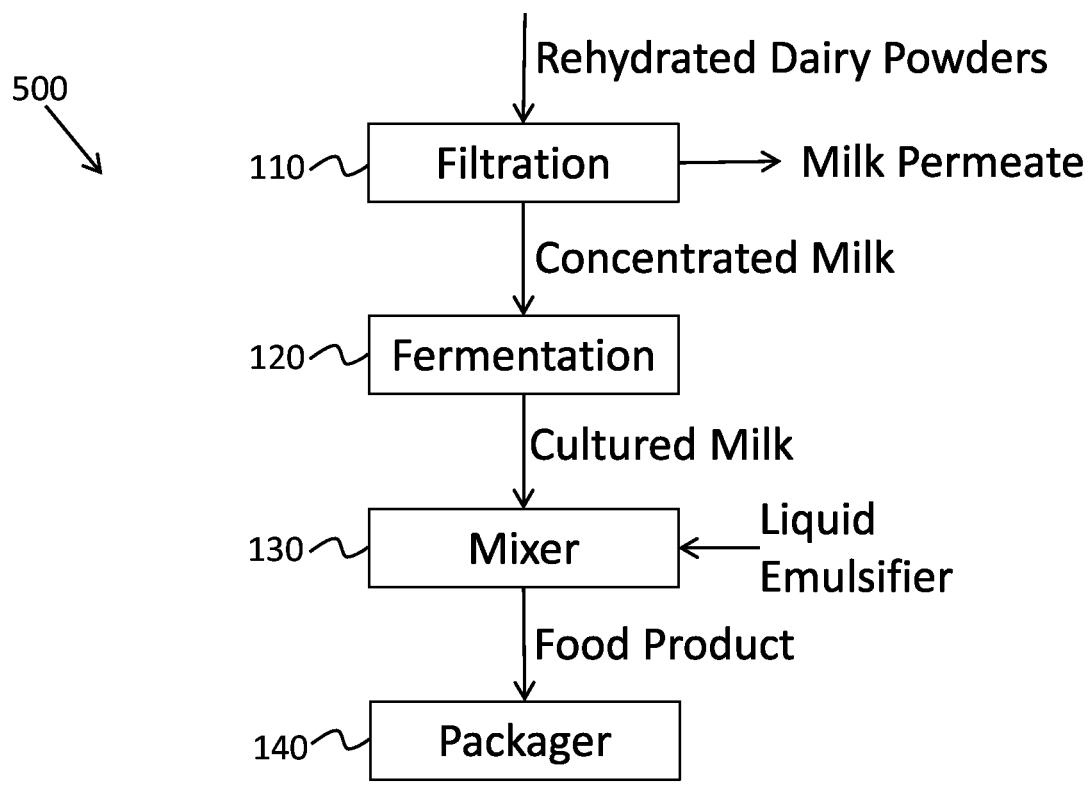

According to another exemplary embodiment, a food product may be produced according to the system 500 of FIG. 5. Aspects of system 500 that are the same as system 100 include numbering corresponding to FIG. 1. According to some embodiments, instead of pasteurized milk, one or more rehydrated dairy powders are subjected to a concentration process 110 thereby forming liquid concentrated milk. In some embodiments, a liquid concentrated milk is formed by rehydrating one or more dairy powders to a higher level of total solids than typical rehydrated milk, i.e.

not adding as much water to the dairy powders during the rehydration process. In some embodiments, the one or more rehydrated dairy powders are pasteurized after rehydration but before fermentation of the liquid concentrated milk. Although not shown in FIG. 5, the fermented or cultured concentrated milk product may be fed to an evaporator 125 in the same manner described herein thereby forming an increased solids cultured milk before being combined with the liquid emulsifying agent in the mixer 130. Furthermore, although not shown in FIG. 5, the food product formed by combining the fermented or cultured concentrated milk product with the liquid emulsifying agent in the mixer 130 may be fed to the evaporator 135 for evaporation before being packaged at the packager 140.

Figure 6:
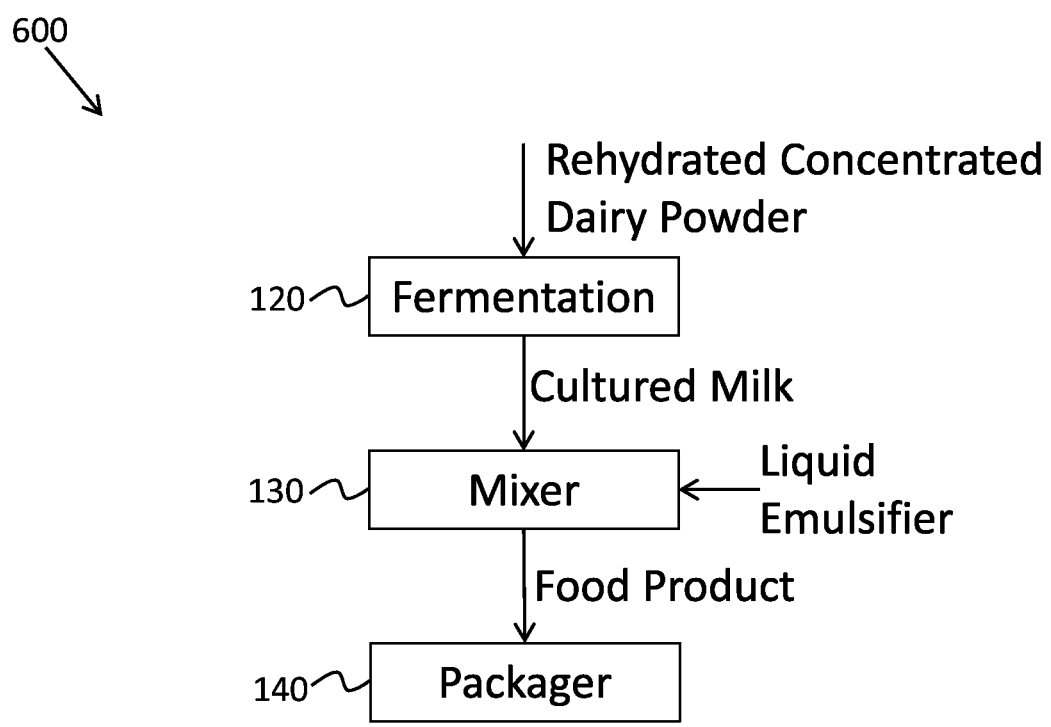

According to another exemplary embodiment, a food product may be produced according to the system 600 of FIG. 6. Aspects of system 600 that are the same as system 100 include numbering corresponding to FIG. 1. According to this embodiment, instead of concentrated milk, one or more rehydrated concentrated dairy powders are subjected to a fermentation process 120 thereby forming a fermented or cultured concentrated milk product. Although not shown in FIG. 6, the fermented or cultured concentrated milk product may be fed to an evaporator 125 thereby forming an increased solids cultured milk before being combined with the liquid emulsifying agent in the mixer 130. Furthermore, although not shown in FIG. 6, the food product formed by combining the fermented or cultured concentrated milk product with the liquid emulsifying agent in the mixer 130 may be fed to the evaporator 135 for evaporation before being packaged at the packager 140.

Figure 7:
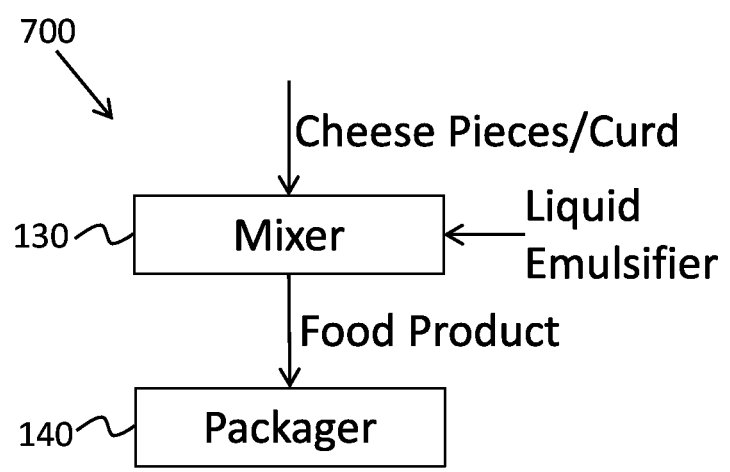

According to another exemplary embodiment, a food product may be produced according to the system 700 of FIG. 7. Aspects of system 700 that are the same as system 100 include numbering corresponding to FIG. 1. According to this embodiment, instead of a fermented or cultured concentrated milk product, one or more of cheese pieces or cheese curds are combined with the liquid emulsifying agent in the mixer 130 thereby forming the food product. For example, cheese pieces or cheese curds may ground, mixed, or otherwise blended with the liquid emulsifying agent in the mixer 130 or other mixer to form a food product. Although not shown in FIG. 7, the food product formed by combining the one or more of cheese pieces or cheese curds with the liquid emulsifying agent in the mixer 130 may be fed to the evaporator 135 for evaporation before being packaged at the packager 140.

Figure 9:
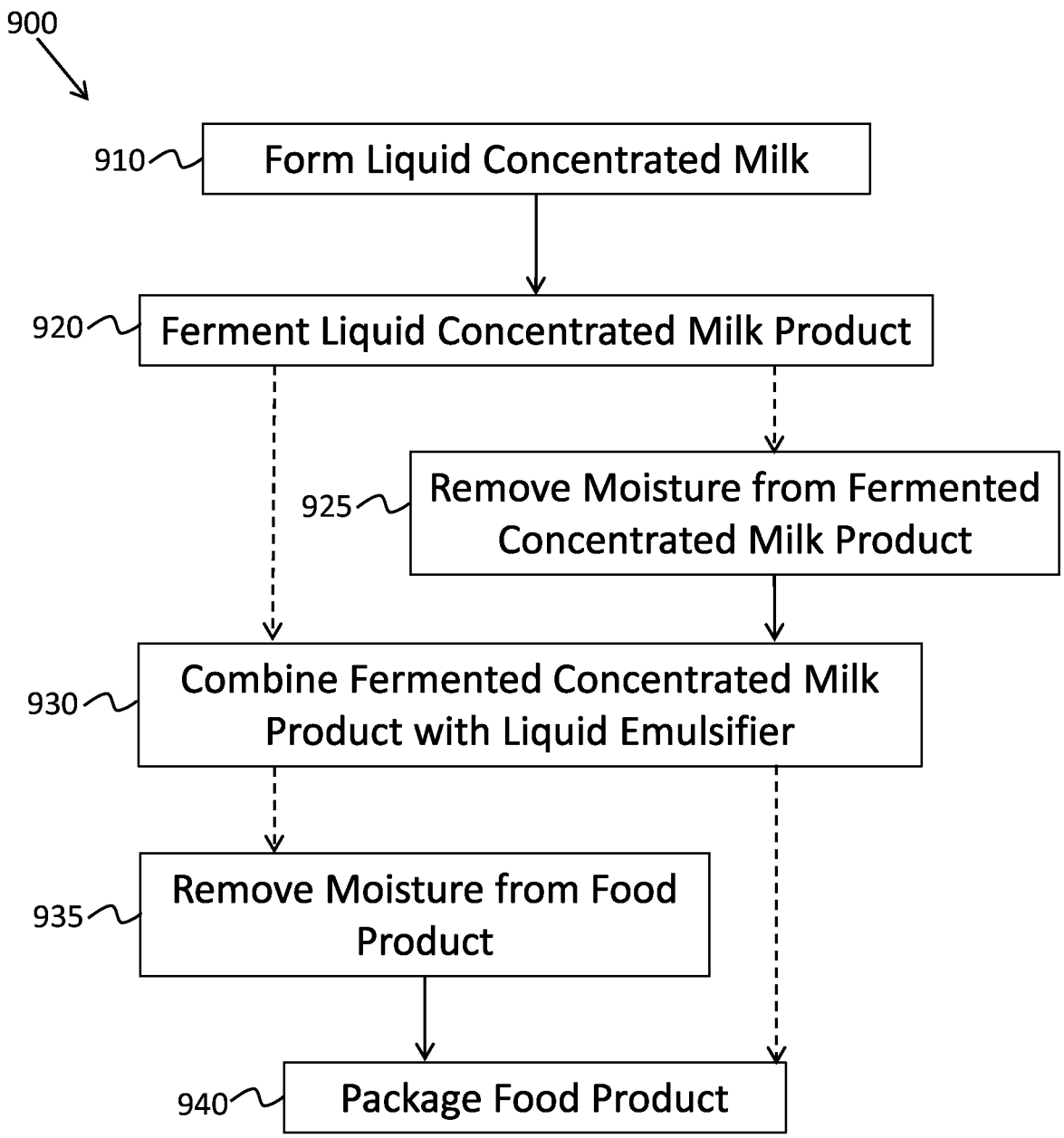
FIG. 9 illustrates exemplary food product production methods according to implementations of the present disclosure.

In another exemplary embodiment, and with reference to the method 900 of FIG. 9, liquid concentrated milk may be formed at step 910. Liquid concentrated milk may be formed at step 910 in varying manners according to different embodiments of the method 900. For example, in some embodiments, liquid concentrated milk may be formed by subjecting pasteurized milk to a concentration process, thereby forming the liquid concentrated milk. The concentration process used in forming the liquid concentrated milk at step 910 may include at least one of ultrafiltration, microfiltration, reverse osmosis, nanofiltration, or some combination thereof. In some embodiments, the concentration process used in forming the liquid concentrated milk at step 910 may be performed under a vacuum. Moreover, in some embodiments, forming the liquid concentrated milk at step 910 also may include removing at least a portion of the lactose or serum proteins from the pasteurized milk using diafiltration. For example, at least one of ultrafiltration or microfiltration may be used in combination with diafiltration to form a liquid concentrated milk having at least portion of the lactose or serum proteins of the pasteurized milk removed while forming the liquid concentrated milk at step 910.

In other embodiments, forming the liquid concentrated milk at step 910 may include rehydrating dairy powders and then forming the liquid concentrated milk at step 910 by subjecting the rehydrated dairy powders to any of the concentration process described herein. In other embodiments, forming the liquid concentrated milk at step 910 may include rehydrating concentrated dairy powders to form the liquid concentrated milk.

In some embodiments of the method 900, the method may include salting the liquid concentrated milk. Salt may be added in amounts of between about 0.5 wt % and about 3 wt % of the salted liquid concentrated milk, or between about 0.9 wt % and about 2.5 wt % of the salted liquid concentrated milk. In many embodiments, the amount of salt added the liquid concentrated milk may be selected based upon a desired texture, consistency, or flavor of the final food product. For example, in the lower solids version referenced above, salt added to the liquid concentrated milk may be between about 0.85 wt % and about 1.35 wt % of the salted liquid concentrated milk, between about 0.96 wt % and about 1.24 wt % of the salted liquid concentrated milk, about 0.96 wt % of the salted liquid concentrated milk, about 0.98 wt % of the salted liquid concentrated milk, about 1.07 wt % of the salted liquid concentrated milk, or about 1.24 wt % of the salted liquid concentrated milk. In the intermediate solids version referenced above, salt added to the liquid concentrated milk may be between about 1.5 wt % and about 2.2 wt % of the salted liquid concentrated milk, between about 1.6 wt % and about 2.1 wt % of the salted liquid concentrated milk, about 1.61 wt % of the salted liquid concentrated milk, about 1.63 wt % of the salted liquid concentrated milk, about 1.78 wt % of the salted liquid concentrated milk, or about 2.07 wt % of the salted liquid concentrated milk. In the higher solids version referenced above, salt added to the liquid concentrated milk may be between about 1.8 wt % and about 2.6 wt % of the salted liquid concentrated milk, between about 1.9 wt % and about 2.5 wt % of the salted liquid concentrated milk, about 1.91 wt % of the salted liquid concentrated milk, about 1.93 wt % of the salted liquid concentrated milk, about 2.11 wt % of the salted liquid concentrated milk, or about 2.46 wt % of the salted liquid concentrated milk.

In some embodiments of method 900, the method may optionally include subjecting the liquid concentrated milk to a heat treatment before fermenting the liquid concentrate milk at step 920. Occasionally, microorganism growth or concentration may occur in the concentration system over the course of operation of the concentration system used in forming the liquid concentrated milk at step 910. The microorganism growth or concentration may occur between standard cleaning processes and may affect the quality of the liquid concentrated milk. To manage the microorganism growth or concentration that may occur in the concentration system, the liquid concentrated milk may be subjected to a heat treatment prior to fermenting the liquid concentrate milk at step 920.

At step 920, the liquid concentrated milk product may be fermented to form a fermented or cultured concentrated milk product. For example, in many embodiments, step 920 may include fermenting the liquid concentrated milk with one or more dairy cultures, such as a freeze-dried starter culture. The freeze-dried starter culture may be combined with the liquid concentrated milk at step 920 in amount of between about 0.1 wt % and about 0.5 wt % of the liquid concentrated milk, between about 0.1 wt % and about 0.3 wt % of the liquid concentrated milk, between about 0.002 wt % and about 0.2 wt % of the liquid concentrated milk, between about 0.002 wt % and about 0.1 wt % of the liquid concentrated milk, between about 0.01 wt % and about 0.1 wt % of the liquid concentrated milk, between about 0.005 wt % and about 0.02 wt % of the liquid concentrated milk, between about 0.01 wt % and about 0.02 wt % of the liquid concentrated milk, less than about 0.5 wt % of the liquid concentrated milk, less than about 0.4 wt % of the liquid concentrated milk, less than about 0.3 wt % of the liquid concentrated milk, less than about 0.2 wt % of the liquid concentrated milk, less than about 0.1 wt % of the liquid concentrated milk, less than about 0.05 wt % of the liquid concentrated milk, less than about 0.04 wt % of the liquid concentrated milk, less than about 0.03 wt % of the liquid concentrated milk, less than about 0.02 wt % of the liquid concentrated milk, or less than about 0.01 wt % of the liquid concentrated milk.

In some embodiments, the method 900 may proceed to removing moisture from the fermented concentrated milk product at step 925. For example, step 925 may include feeding the fermented or cultured concentrated milk product to an evaporator thereby removing moisture from the fermented concentrated milk product and forming an increased solids fermented or cultured concentrated milk product.

During evaporative food processing of the fermented or cultured concentrated milk product at step 925, the fermented or cultured concentrated milk product does not reach a temperature sufficient to kill the active cultures in the fermented or cultured concentrated milk product. At step 925, the fermented or cultured concentrated milk product is not subjected to direct steam injection and may not be subjected to other forms of heat treatment sufficient to kill active cultures in the fermented or cultured concentrated milk product when moisture is removed from the fermented or cultured concentrated milk product through the evaporative process at step 925. Moreover, when moisture is removed from the fermented or cultured concentrated milk product through an evaporative process at step 925, the moisture is removed in the absence of external heat being added directly to the fermented or cultured concentrated milk product. Accordingly, during evaporative processing at step 925, the fermented or cultured concentrated milk product may not reach a temperature about 150° F., 145° F., 140° F., 135° F., 130° F., 125° F., 120° F., 115° F., 115° F., 110° F., 105° F., or 100° F. according to various embodiments.

Removing moisture from the fermented concentrated milk product at step 925 may include removing moisture from the fermented concentrated milk product with at least one of a wiped film evaporator, a thin film evaporator, a spinning cone evaporator, or an evaporative scraped surface heat exchangers, although a wiped film evaporator may be preferred. In various embodiments, removing moisture from the fermented concentrated milk product at step 925 includes removing moisture from the fermented concentrated milk product with a wiped film evaporator such that the fermented or cultured concentrated milk product may not reach a temperature about 150° F., 145° F., 140° F., 135° F., 130° F., 125° F., 120° F., 115° F., 115° F., 110° F., 105° F., or 100° F. Accordingly, removing moisture from the fermented concentrated milk product with a wiped film evaporator under of a vacuum pressure of between about 24.5 and about 29.3 inches of mercury, between about 25 and about 29.2 inches of mercury, between about 26.0 inches of mercury and about 29.0 inches of mercury, between about 27.0 and about 28.0 inches of mercury, greater than about 24.1 inches of mercury, greater than about 26.2 inches of mercury, greater than about 27.8 inches of mercury, greater than about 28.7 inches of mercury, greater than about 28.9 inches of mercury, or greater than about 29.0 inches of mercury.

In many embodiments, the method 900 may proceed from either step 920 or step 925 to combining fermented concentrated milk product with liquid emulsifying agent at step 930 to form a food product. For example, in certain embodiments, the fermented or cultured concentrated milk product is not evaporated before being combined with liquid emulsifying agent at step 930. The liquid emulsifying agent combined with the fermented concentrated milk product at step 930 may include at least one of liquid sodium phosphate, liquid sodium citrate, liquid potassium phosphate, liquid potassium citrate, or a combination thereof. Even if the liquid emulsifying agent is formed through an exothermic reaction, when combining fermented concentrated milk product with liquid emulsifying agent at step 930 to form a food product, the food product does not reach a temperature of 150° F. At step 930, the fermented concentrated milk product is not subjected to direct steam injection or other forms of heat treatment sufficient to kill active cultures in the fermented concentrated milk product when the liquid emulsifying agent is added to the fermented concentrated milk product. Instead, the liquid emulsifying agent is combined with the fermented concentrated milk product at step 930 in the absence of external heat being added to the mixture, the external heat including direct steam injection and direct or indirect heating of at least one of the fermented concentrated milk product, the liquid emulsifying agent, or the combination of the fermented concentrated milk product and the liquid emulsifying agent.

In many embodiments, when emulsifying the fermented or cultured concentrated milk product with the liquid emulsifying agent at step 930, the food product formed does not reach a temperature of 150° F., 145° F., 140° F., 135° F., 130° F., 125° F., 120° F., 115° F., 110° F., 105° F., 100° F., 95° F., or 90° F. Accordingly, temperatures reached during combining the liquid emulsifying agent and the fermented or cultured concentrated milk product described herein do not kill the active cultures typical to the fermented or cultured concentrated milk product.

The amount of liquid emulsifying agent combined with the fermented or cultured concentrated milk product at step 930 may vary according to different embodiments. According to various embodiments, the relative amount of liquid emulsifying agent combined with the fermented or cultured concentrated milk product may be selected to achieve desired texture or consistency in the final food product. For example, a food product having softer, process cheese spread characteristics may be formed using less liquid emulsifying agent than the liquid emulsifying agent used to form a more elastic or plastic process cheese product. In some embodiments, the amount of liquid emulsifying agent combined with the fermented or cultured concentrated milk product at step 930 may be between about 1.0 wt % and about 6.0 wt % of the food product, between about 1.5 wt % and about 5.5 wt % of the food product, between about 2 wt % and about 5 wt % of the food product, between about 4.0 wt % and about 6.0 wt % of the product, between about 4.5 wt % and about 5.5 wt % of the food product, less than about 6.0 wt % of the food product, less than about 5.5 wt % of the food product, less than about 5.0 wt % of the food product, less than about 4.5 wt % of the food product, less than about 4.0 wt % of the food product, less than about 3.5 wt % of the food product, less than about 3.0 wt % of the food product, less than about 2.5 wt % of the food product, or less than about 2.0 wt % of the food product.

In some embodiments, the amount of liquid emulsifying agent combined with the fermented or cultured concentrated milk product at step 930 may be determined as a ratio to the amount of fat in the food product. For example, for every 1 part fat in the food product, the food product may include between about 0.05 and about 0.3 parts liquid emulsifying agent, between about 0.1 and about 0.25 parts liquid emulsifying agent, between about 0.15 and about 0.22 parts liquid emulsifying agent, less than about 0.3 parts liquid emulsifying agent, less than about 0.25 parts liquid emulsifying agent, or less than about 0.22 parts liquid emulsifying agent. For example, in an embodiment of a food product having about 39.6 wt % moisture and about 28.2 wt % fat, the food product may include about 4.7 wt % liquid emulsifying agent, or 0.1668 parts liquid emulsifying agent per 1 part fat. In another embodiment, a food product having about 39.5 wt % moisture and about 31.91 wt % fat, the food product may include about 4.67 wt % liquid emulsifying agent, or 0.1465 parts liquid emulsifying agent per 1 part fat. In another embodiment, a food product having about 49.8 wt % moisture and about 20.20 wt % fat, the food product may include about 4.32 wt % liquid emulsifying agent, or 0.2139 parts liquid emulsifying agent per 1 part fat. In another embodiment, a food product having about 41.15 wt % moisture and about 26.73 wt % fat, the food product may include about 5.42 wt % liquid emulsifying agent, or 0.2027 parts liquid emulsifying agent per 1 part fat.

In many embodiments, combining fermented concentrated milk product with liquid emulsifying agent at step 930 may include combining fermented concentrated milk product with liquid emulsifying agent in any of a number of different mixers, such as an inline mixer. In some embodiments, combining fermented concentrated milk product with liquid emulsifying agent at step 930 includes combining the liquid emulsifying agent with the fermented or cultured concentrated milk product in a continuous manner in an inline mixer after the formation of the fermented or cultured concentrated milk product in order to maximize the structure forming properties of the intact casein present in the fermented or cultured concentrated milk product. As noted above, adding the liquid emulsifying agent in a very short duration after the concentrated milk is fermented is advantageous to forming a food fermented product having more intact casein relative to natural cheese where intact casein is reduced prior to use by sitting for an extended period of time.

In some embodiments, combining fermented concentrated milk product with liquid emulsifying agent at step 930 may include combining one or more of cheese pieces or cheese curds with the liquid emulsifying agent. Combining one or more of cheese pieces or cheese curds with the liquid emulsifying agent may include grinding, mixing, or otherwise blending cheese pieces or cheese curds with the liquid emulsifying agent in an inline mixer or other mixer to form the food product.

In some embodiments, the method 900 may proceed to removing moisture from the food product at step 935. For example, step 935 may include feeding the food product to an evaporator thereby removing moisture from the food product and forming a firmer food product. During evaporative processing of the food product at step 935, the food product does not reach a temperature sufficient to kill the active cultures in the food product. At step 935, the food product is not subjected to direct steam injection and may not be subjected to other forms of heat treatment sufficient to kill active cultures in the food product when moisture is removed from the food product through the evaporative process at step 935. Moreover, when moisture is removed from the food product through an evaporative process at step 935, the moisture is removed in the absence of external heat being added directly to the food product. Accordingly, during evaporative processing at step 935, the food product may not reach a temperature about 150° F., 145° F., 140° F., 135° F., 130° F., 125° F., 120° F., 115° F., 115° F., 110° F., 105° F., or 100° F. according to various embodiments.

Removing moisture from the food product at step 935 may include removing moisture from the food product with at least one of a wiped film evaporator, a thin film evaporator, a spinning cone evaporator, or an evaporative scraped surface heat exchangers, although a wiped film evaporator may be preferred. In various embodiments, removing moisture from the food product at step 935 includes removing moisture from the food product with a wiped film evaporator such that the food product may not reach a temperature about 150° F., 145° F., 140° F., 135° F., 130° F., 125° F., 120° F., 115° F., 115° F., 110° F., 105° F., or 100° F. Accordingly, removing moisture from the food product with a wiped film evaporator under of a vacuum pressure of between about 24.5 and about 29.3 inches of mercury, between about 25 and about 29.2 inches of mercury, between about 26.0 inches of mercury and about 29.0 inches of mercury, between about 27.0 and about 28.0 inches of mercury, greater than about 24.1 inches of mercury, greater than about 26.2 inches of mercury, greater than about 27.8 inches of mercury, greater than about 28.7 inches of mercury, greater than about 28.9 inches of mercury, or greater than about 29.0 inches of mercury.

In some embodiments, the method 900 may proceed from either step 930 or step 935 to packaging the food product at step 940. For example, the food product may be sent from the mixer at step 930 or the evaporator at step 935 to a packager 140, such as a filler, for packaging of the food product at step 940. It is noted that throughout the method 900 of FIG. 9, the food product is formed without treating the fermented or cultured concentrated milk product or the food product with heat sufficient to kill active cultures in the fermented or cultured concentrated milk product or the food product, such that the fermented or cultured concentrated milk product and the food product do not reach a temperature of 150° F., 145° F., 140° F., 135° F., 130° F., 125° F., 120° F., 115° F., 115° F., 110° F., 105° F., or 100° F. according to various embodiments of method 900.

EXAMPLES

Table 1 includes final cheese product compositions for four examples of cheese products according to the present disclosure. Each of the four examples were concentrated through a concentration process to form a liquid concentrated milk, followed by fermentation of the liquid concentrated milk with less than 0.0015 wt % freeze-dried dairy cultures to form a fermented or cultured concentrated milk product. The fermented or cultured concentrated milk product of each of the four examples were then combined with the amounts of liquid emulsifying agent shown in Table 1. In Examples 1, 2, and 3, the liquid emulsifying agent used was liquid sodium phosphate. In Example 4, the liquid emulsifying agent was liquid sodium citrate. Following combining the liquid emulsifying agent with the fermented or cultured concentrated milk product to form the food product, each of the four examples were evaporated in a evaporation chamber of wiped film evaporator under a vacuum pressure of between 26 and 29 inches of mercury.

TABLE 1

| Description | Example 1 | Example 2 | Example 3 | Example 4 |
| --- | --- | --- | --- | --- |
| Moisture | 39.60 | 39.50 | 49.80 | 41.15 |
| Fat | 28.20 | 31.91 | 20.20 | 26.73 |
| Salt | 2.19 | 2.22 | 2.00 | 2.70 |
| Protein | 18.69 | 18.94 | 15.85 | 17.61 |
| Total Solids | 60.40 | 60.50 | 50.20 | 58.85 |
| Liquid Emulsifying Agent | 4.70 | 4.67 | 4.32 | 5.42 |
| Protein/Fat | 0.6628 | 0.5935 | 0.7847 | 0.6588 |
| Salt/Fat | 0.0777 | 0.0696 | 0.0990 | 0.1010 |
| Liquid Emulsifying Agent/Fat | 0.1668 | 0.1465 | 0.2139 | 0.2027 |

While the systems and methods disclosed herein have been described and shown with reference to particular operations performed in a particular order, it will be understood that these operations may be combined, sub-divided, or re-ordered to form equivalent methods without departing from the teachings of the present disclosure. Accordingly, unless specifically indicated herein, the order and grouping of the operations should not be construed as limiting.

Similarly, it should be appreciated that in the foregoing description of example embodiments, various features are sometimes grouped together in a single embodiment, figure, or description thereof for the purpose of streamlining the disclosure and aiding in the understanding of one or more of the various aspects. These methods of disclosure, however, are not to be interpreted as reflecting an intention that the claims require more features than are expressly recited in each claim. Rather, as the following claims reflect, inventive aspects lie in less than all features of a single foregoing disclosed embodiment, and each embodiment described herein may contain more than one inventive feature.

While the present disclosure has been particularly shown and described with reference to embodiments thereof, it will be understood by those skilled in the art that various other changes in the form and details may be made without departing from the spirit and scope of the disclosure.

What is claimed is:

1. A method for the production of a food product, the method comprising:
   subjecting pasteurized milk to a concentration process thereby forming liquid concentrated milk;
   fermenting the liquid concentrated milk thereby forming a fermented concentrated milk product containing one or more active dairy cultures;
   combining the fermented concentrated milk product with a liquid emulsifying agent thereby forming a food product, wherein during the step of combining, the food product is formed at or below a temperature of 145° F. such that the one or more active dairy cultures from the fermented concentrated milk product are retained in the food product.

2. The method of claim 1, further comprising removing moisture from the food product after combining the fermented concentrated milk product with the liquid emulsifying agent through evaporative processing thereby producing a plastic food product, wherein during the step of removing moisture, the plastic food product is formed at or below a temperature of 145° F. such that the one or more active dairy cultures in the food product are retained in the plastic food product.

3. The method of claim 2, wherein removing moisture from the food product after combining the fermented concentrated milk product with the liquid emulsifying agent through evaporative processing thereby producing a plastic food product includes removing the moisture from the food product through evaporative processing in a wiped film evaporator to produce the plastic food product.

4. The method of claim 1, wherein the concentration process includes at least one of ultrafiltration, microfiltration, reverse osmosis, or evaporation.

5. The method of claim 2, wherein the concentration process includes at least one of ultrafiltration or microfiltration, and the concentration process removes at least a portion of lactose or serum proteins from the pasteurized milk using diafiltration.

6. The method of claim 1, wherein combining the fermented concentrated milk product with a liquid emulsifying agent thereby forming a food product includes combining, in an inline mixer, the fermented concentrated milk product with the liquid emulsifying agent thereby forming the food product.

7. The method of claim 1, wherein the liquid emulsifying agent includes at least one of liquid sodium phosphate, liquid sodium citrate, or liquid potassium phosphate.

8. The method of claim 1, wherein combining the fermented concentrated milk product with a liquid emulsifying agent thereby forming a food product includes combining the fermented concentrated milk product with a predetermined amount of the liquid emulsifying agent to form the food product of a spreadable cheese.

9. The method of claim 1, further comprising removing moisture from the fermented concentrated milk product through evaporative processing after fermenting the liquid concentrated milk and before combining the fermented concentrated milk product with the liquid emulsifying agent, wherein during the step of removing moisture, the fermented concentrated milk product does not reach a temperature of 145° F. such that the one or more active dairy cultures from the fermented concentrated milk product are retained in the fermented concentrated milk product after the step of removing moisture.

10. The method of claim 1, further comprising combining the fermented concentrated milk product with chymosin.

11. A method for the production of a food product, the method comprising:
    fermenting liquid concentrated milk thereby forming a fermented concentrated milk product containing one or more active dairy cultures;
    combining the fermented concentrated milk product with a liquid emulsifying agent thereby forming a food product, wherein during the step of combining, the food product is formed at or below a temperature of 145° F. such that the one or more active dairy cultures from the fermented concentrated milk product are retained in the food product.

12. The method of claim 11, further comprising removing moisture from the food product after combining the fermented concentrated milk product with the liquid emulsifying agent through evaporative processing thereby producing a plastic food product, wherein during the step of removing moisture, the plastic food product is formed at or below a temperature of 145° F. such that that the one or more active dairy cultures in the food product are retained in the plastic food product.

13. The method of claim 12, wherein removing moisture from the food product after combining the fermented concentrated milk product with the liquid emulsifying agent through evaporative processing thereby producing a plastic food product includes removing the moisture from the food product through evaporative processing in a wiped film evaporator to produce the plastic food product.

14. The method of claim 11, further comprising subjecting pasteurized milk to a concentration process thereby forming the liquid concentrated milk, wherein the concentration process includes at least one of ultrafiltration or microfiltration and removes at least a portion of lactose or serum proteins from the pasteurized milk using diafiltration.

15. The method of claim 11, wherein the liquid emulsifying agent includes at least one of liquid sodium phosphate, liquid sodium citrate, or liquid potassium phosphate.

16. The method of claim 11, further comprising hydrating one or more dairy powders to form the form the liquid concentrated milk.

17. A method for the production of a food product, the method comprising combining a dairy product containing one or more active dairy cultures with a liquid emulsifying agent thereby forming a food product, wherein during the step of combining, the food product is formed at or below a temperature of 145° F. such that the one or more active dairy cultures from the dairy products are retained in the food product, wherein the dairy product includes one of ground cheese or a fermented concentrated milk product.

18. The method of claim 17, wherein the dairy product includes the ground cheese.

19. The method of claim 17, wherein the dairy product includes the fermented concentrated milk product and the method further comprises forming the dairy product by:
    filtrating pasteurized whole milk using at least one of ultrafiltration or microfiltration to form a liquid concentrated milk; and
    fermenting the liquid concentrated milk to form the fermented concentrated milk product.

20. The method of claim 17, wherein the dairy product includes the fermented concentrated milk product and the method further comprises forming the dairy product by:
    hydrating one or more dairy powders to form the form a liquid concentrated milk;
    pasteurizing the liquid concentrated milk; and
    fermenting the liquid concentrated milk to form the fermented concentrated milk product.

* * * * *